United States Patent [19]
Yanagida et al.

[11] 4,451,863
[45] May 29, 1984

[54] INFORMATION REPRODUCING APPARATUS BASED ON OPTO-MAGNETIC EFFECT

[75] Inventors: Tuneo Yanagida; Kiichi Kato, both of Hachioji, Japan

[73] Assignee: Olympus Optical Company Limited, Japan

[21] Appl. No.: 352,525

[22] Filed: Feb. 26, 1982

[30] Foreign Application Priority Data

Mar. 5, 1981 [JP] Japan .................................. 56-31517

[51] Int. Cl.³ .......................... G11B 5/32; G11B 7/00
[52] U.S. Cl. ..................................... 360/114; 369/46; 369/110; 369/112
[58] Field of Search ................... 360/114; 369/13, 44, 369/45, 46, 106, 110, 109, 112; 350/400, 401, 402, 403, 405, 406; 365/121, 122

[56] References Cited

U.S. PATENT DOCUMENTS

| | | | |
|---|---|---|---|
| 3,396,266 | 8/1968 | Max et al. | 365/121 X |
| 3,739,362 | 6/1973 | Eschelbach | 360/114 |
| 3,876,842 | 4/1975 | Bouwhuis | |
| 3,919,698 | 11/1975 | Bricot et al. | 369/110 X |
| 4,125,860 | 11/1978 | Ishii et al. | 369/44 X |

FOREIGN PATENT DOCUMENTS

WO80/01016 5/1980 PCT Int'l Appl. ................ 369/110

Primary Examiner—Donald E. McElheny, Jr.
Attorney, Agent, or Firm—Parkhurst & Oliff

[57] ABSTRACT

An information reproducing apparatus for reproducing information recorded on a record medium based on an opto-magnetic effect is disclosed. A laser light source, a first polarizing beam splitter, a first Faraday element, a second polarizing beam splitter, an optical member having a second Faraday element or a rotatory polarizer, and first and second photodetectors, which elements are positioned along an optical axis in the described order. The angle between the polarizing axis of the first beam splitter and the polarizing axis of the second beam splitter is made $\pi/4$ and Faraday elements rotate the polarizing direction of the light beam therethrough. The first photodetector receives the laser beam reflected by the record medium and the second beam splitter and the second photodetector receives the laser beam reflected by the record medium, transmitted through the second beam splitter and reflected by the first beam splitter.

11 Claims, 8 Drawing Figures

INFORMATION REPRODUCING APPARATUS BASED ON OPTO-MAGNETIC EFFECT

BACKGROUND OF THE INVENTION

The present invention relates to a technique for recording and reproducing information recorded on a record medium based on an opto-magnetic effect, and more particularly to an information reproducing apparatus which reads out the recorded information by irradiating a laser beam on an opto-magnetic recording medium.

Such a reproducing apparatus based on an opto-magnetic system utilizing Polar-Kerr effect comprises, as shown in FIG. 1, a tracking servo means and a focusing servo means. In this apparatus a method of using three beam is adopted as the tracking servo means and a method of using astigmatism is adopted as the focusing servo means. A laser diode drive circuit 1 energizes a laser diode 2. A light beam emitted from the laser diode 2 is converted into a collimated light beam by a collimator lens 3. The collimated light beam is divided by a grating 4 into three light beams for tracking. The light beams emanated from the grating 4 are converted into linearly polarized light beams by a polarizer 5, divided into two halves by a half-mirror 6 and converged and projected onto a record medium D as light spots by a pick-up device 7 including an objective lens. The light beam projected onto the record medium D is subjected to optical rotation due to Kerr effect (hereinafter referred to as Kerr rotation) according to the direction of magnetization at the projected portion of the record medium determined by recorded signals, and reflected to a half-mirror 9 through the half-mirror 6 and a relay lens 8. The light beams divided by the half-mirror 9 are converted into electric signals by photodetectors 14 and 17 through analyzers 11 and 12 having predetermined analyzing angles $+\phi$ and $-\phi$, respectively, and these electric signals are supplied to a differential amplifier 19 thereby generating a reproduced information signal. The focusing servo is so performed that the half of light beams divided by the half-mirror 9 is converted by a cylindrical lens 10 into a light beam for focusing, changed into an electric signal, that is, a servo signal simultaneously with the reproduced information signal by the photodetector 17 which is generally divided into four, and supplied to the pick-up device 7 through a focus drive circuit 22 thereby driving a focus drive mechanism provided to the pick-up device 7.

A method of detecting the focus servo signal with the use of the cylindrical lens 10 is already well known as an astigmatism method in a video disc player or like optical systems.

The tracking servo is to effected that three light beams divided by the grating 4 are changed into electric signals by photodetectors 13, 15 and 16, 18, differentially amplified by differential amplifiers 20, 21, added by an adder 23 thereby to obtain a tracking servo signal and supplied to the pick-up device 7 through a tracking drive circuit 24 thereby driving a tracking drive mechanism provided to the pick-up device 7. A method of detecting the tracking servo signal is already well known as the three beam method in the video disc player or like systems.

The signal reproducing method utilizing the above described opto-magnetic effect has several problems as follows. In the first place, the utility factor or efficiency for output light of the laser diode 2 is low, because the light beam emitted from the laser diode 2 is divided into two by the half-mirror 6 so that only a half of the output light can be utilized and projected on the surface of the record medium D. Secondly, the reflected light beam subjected to Kerr rotation on the surface of the record medium D is again divided into two by the half-mirror 6 and the half of the divided light beams is returned to the laser diode 2. Therefore if use is made of a laser diode oscillating in a single mode or a mode similar thereto, interference takes place between the radiated light beam and the reflected light beam. This phenomenon is well known as a back-talk. This back-talk becomes a cause of a bad influence upon S/N of the reproduced signal and instability of focusing servo and tracking servo. In the optical video disc player or the like, a quarter-wave length plate and a polarization beam splitter or the like are used to prevent the generation of back-talk. However, this method cannot be used for signal reproduction utilizing opto-magnetic effect, because the linear polarized light becomes elliptic by the quarter-wave length plate.

Because of the above problems the optical system shown in FIG. 1 is very insufficient to use as reproducing optical system utilizing the opto-magnetic effect.

It has been proposed to provide an optical system for reproduction capable of improving the utility factor of light beam and influence of back-talk. FIG. 2 shows a construction of such a known optical system. In this optical system a light beam emanated from a laser diode 25 is converted into a collimated light beam by a collimator lens 26 and then converted into a linearly polarized light by a polarizing beam splitter 27. The polarizing direction of the linearly polarized light is rotated by an angle $\phi$ a during transmitting through a Faraday element 29 placed in a coil 28 for applying a biasing magnetic field, and the light beam is further converged by a pick-up device 30 and is made incident upon the surface of a record medium 32 as a beam spot. The reflected light beam subjected to a Kerr rotation in accordance with a signal recorded on the record medium 32 is collected by the pick-up device 30, the polarizing direction of the reflected light beam is rotated by an angle $\phi$, and the polarized light beam components corresponding to the polarizing axis are transmitted and reflected by the polarizing beam splitter 27, respectively. The reflected light beam component is detected by a photodetector 31 to obtain the reproduced signal. FIG. 3 shows polarized condition of each portion of the optical system shown in FIG. 2. Provided that polarizing direction of the polarizing beam splitter 27 is set to the y(p) direction shown in FIG. 3-I$a$, only the y(p) direction components of light beams radiated from the laser diode 25 are transmitted to obtain a linearly polarized light as shown in FIG. 3-I$a$. When the linearly polarized light impinges on the Faraday element 29, the polarizing angle of the linearly polarized light is rotated by an angle $\phi$ according to the Verdet's constant of the element 29 and the applied magnetic field as shown in FIG. 3-II$a$. When the linearly polarized light having the polarizing direction rotated by the angle $\phi$ impinges upon the record medium 32, on which the information signal is recorded as shown in FIG. 4, it is subjected to the Kerr rotation corresponding to opto-magnetic constant of the record medium. Then, as shown in FIG. 3-II$a$ the incident light is again rotated in the polarizing direction by angle $\pm\theta_K$ about the polarizing angle $\phi$, respectively, according to the direction of magnetization in the record medium. As shown in FIG. 4 the record medium 32 has a construction in which a thin film 34 having an opto-magnetic effect is applied on a substrate 35, and information are recorded on the thin film 34 by subjecting to magnetization as shown by arrows. The polarizing angle of the reflected light subjected to Kerr rotation is further rotated by an angle $\phi$ as shown in FIG. 3-I$_{b-1}$, while transmitting through the Faraday element 29 and thus, as shown in FIG. 3-I$_{b-2}$, light beam components corresponding to each polarizing axis are transmitted through and reflected by the beam splitter 27. When a protecting dielectric film is not applied on the surface of the record medium, the fact that the linearly polarized light incident on the surface of the record medium perpendicularly becomes elliptic can fully be ignored. Then if the amplitude of incident linearly polarized light is taken as Il, the signal component IA of the reflected light in the x-axis direction of the polarizing light beam splitter 27 is given by the following equation (I).

$$IA = Il\left[\left\{\cos^2\left(\frac{\pi}{2} - 2\phi - \theta_k\right) + \xi\right\} - \left\{\cos^2\left(\frac{\pi}{2} - 2\phi + \theta_k\right) + \xi\right\}\right] \quad (1)$$

$$= 4Il\sin2\phi\cos2\phi\cos\theta_k\sin\theta_k$$

where $\xi$ is extinction ratio.

Substantially K for 2Il $\cos\theta_k \sin\theta_k$ in the above equation (1), the following expression is obtained.

$$IA = 2K\sin2\phi\cos2\phi$$
$$= K\sin4\phi$$

The signal component IA becomes maximum when $\phi = \pi/8$. That is, when the polarizing direction of the reflected light is made $\pi/4$ with respect to the polarization axis of the polarizing light beam splitter 27, the signal component IA becomes maximum.

On the other hand, the signal component IB of the reflected light in the y-axis direction of the polarizing light beam splitter 27 is given by the following equation (2).

$$IB = Il[\{\cos^2(2\phi - \theta_k) + \xi\} - \{\cos^2(2\phi + \theta_k) + \xi\}] \quad (2)$$

$$= 4Il\sin2\phi\cos2\phi\cos\theta_k\sin\theta_k$$

Substituting K for 2Il $\cos\theta_k \sin\theta_k$ in the above equation (2), following expression is obtained.

$$IB = 2K\sin2\phi\cos2\phi$$
$$= K\sin4\phi$$

In the same manner as in the equation (1) when the polarizing direction of the reflected light is made $\pi/4$ with respect to the polarization axis of the beam splitter 27, the signal components IB becomes maximum.

In the optical system shown in FIG. 2 the utility factor of light can be made high by coinciding the polarizing direction of the laser beam emitted from the laser diode 25 with the polarizing axis direction of the beam splitter 27, but under the condition that signal component is maximum as shown by equations (1) and (2), quantity of light transmitted to the laser diode side through the beam splitter 27 becomes about one-half of that of light reflected by the surface of the record medium so that it is impossible to prevent the undesired influence of the back-talk. While under the condition that $\phi = \pi/4$ i.e. the influence of the back-talk is made minimum, quantity of signal component becomes zero. As explained above in detail the known optical system shown in FIG. 2 is not suitable for reproducing the information signal having high S/N with a reliable manner.

SUMMARY OF THE INVENTION

It is an object of the present invention to overcome the above described disadvantages of the conventional information reproducing apparatus.

It is another object of the present invention to provide an information reproducing apparatus for reproducing information with the use of an opto-magnetic effect, which apparatus can obtain reproduced signal with high S/N and can perform stable tracking servo and focusing servo by making the utility factor of laser beam high, while the back-talk is removed completely.

According to the present invention there is provided an information reproducing apparatus for reading out information recorded on a record medium based on an opto-magnetic effect, the apparatus comprises: a light source for generating a collimated light beam; a first polarizing beam splitter arranged to receive the collimated light beam and having a polarizing axis extending in a given direction for converting the collimated light beam therethrough into a linearly polarized light beam; a first Faraday element arranged to receive the light beam transmitted through the first beam splitter for rotating the polarizing direction of the linearly polarized light beam by an angle $\pi/4$, a second polarizing beam splitter arranged to receive the light beam transmitted through the first Faraday element and having a polarizing axis slanted by an angle $\pi/4$ with respect to the polarizing axis of the first beam splitter; a pick-up device arranged to receive the light beam transmitted through the second beam splitter for projecting and converging of light beam onto the record medium; a first photodetector arranged to receive the light beam reflected by the record medium and the second beam splitter; and a second photodetector arranged to receive the light beam reflected by the record medium, transmitted through the second beam splitter and reflected by the first beam splitter.

An optical member for rotating the polarizing direction of the light beam transmitted therethrough is provided between the second beam splitter and the pick-up device. The optical member is a second Faraday element.

The optical member comprises two halves of a rotatory polarizer having clockwise and anticlockwise rotatory polarizing direction, respectively, thereby rotating the polarizing direction of the light beam reflected by the record medium and transmitted through the optical member with respect to the polarizing direction of the linearly polarized light beam incident upon the optical member. The light source is a semiconductor diode for generating the collimated light beam having a polarizing direction parallel with the polarizing axis of the first beam splitter.

DESCRIPTION OF THE PREFERRED EMBODIMENTS

Figure 5:
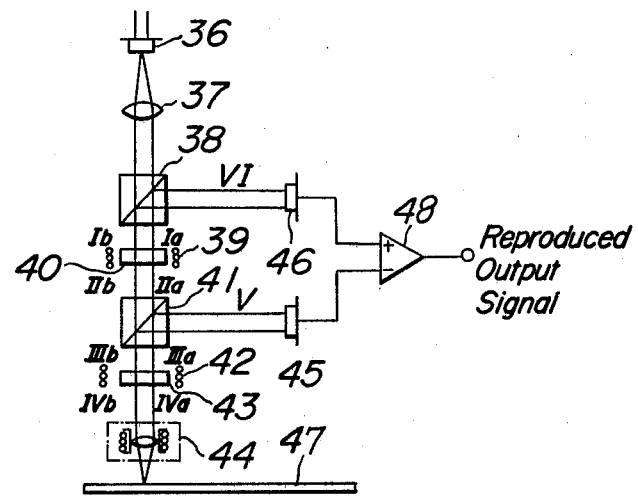
FIG. 5 is a diagrammatic view showing a construction of one embodiment of the information reproducing apparatus based on an opto-magnetic system according to the present invention.

Referring now to FIG. 5, there is shown one embodiment of the information reproducing apparatus according to the present invention. A laser light beam emitted from a laser diode 36 is converted into a collimated light beam by a collimator lens 37 and the collimated light beam is converted into a linearly polarized light beam by a first polarizing light beam splitter 38. The light beam transmitted through the beam splitter 38 is made incident upon a first Faraday element 40 which comprises a coil 39 for generating a biasing magnetic field thereby rotating the polarizing direction of light beam transmitted therethrough. The light beam passed through the element 40 is made incident upon a pick-up device 44 through a second polarizing light beam splitter 41 having a polarization axis inclined by an angle $\pi/4$ with respect to that of the beam splitter 38, and a second Faraday element 43 having a coil 42 for generating biasing magnetic field thereby rotating the polarizing direction of light beam therethrough. The pick-up device 44 comprises focusing and tracking servo mechanisms and an objective lens. The laser light beam passed through the pick-up device 44 is converged thereby and projected onto a record medium 47. The reflected light beam from the second medium 47 is reflected by the second and the first beam splitters 41 and 38 and received by first and second photodetectors 45 and 46, respectively. The output signals from the photodetectors 45 and 46 are supplied to a differential amplifier 48 to produce a reproduced signal.

Next, the operation of the information reproducing apparatus shown in FIG. 5 will be described.

Figure 1:
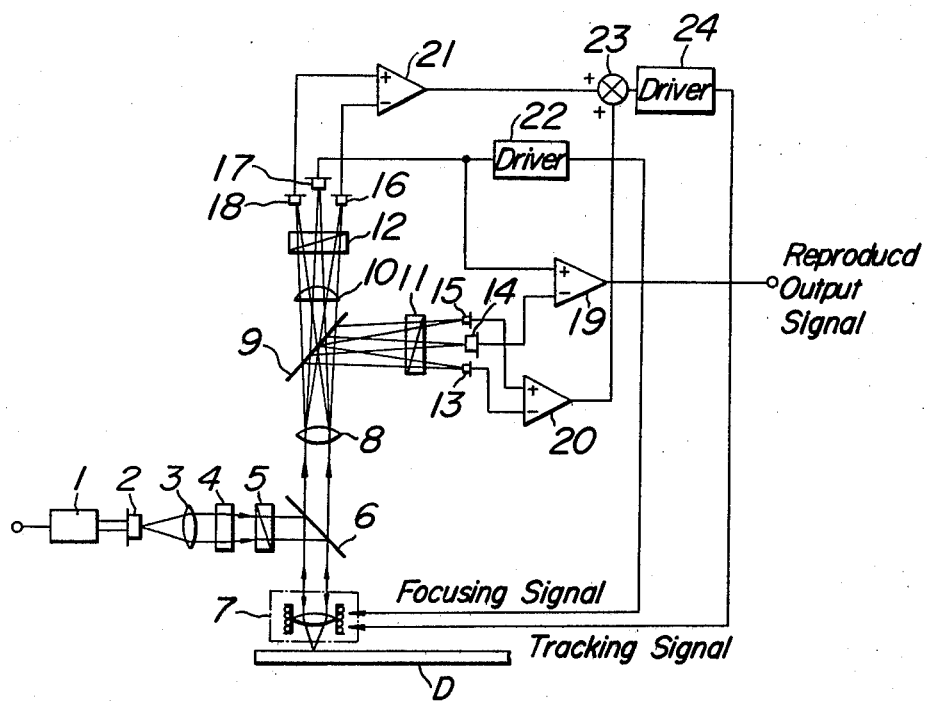
FIG. 1 is a diagrammatic view showing a construction of one embodiment of conventional information reproducing apparatus based on an opto-magnetic system.
Figure 2:
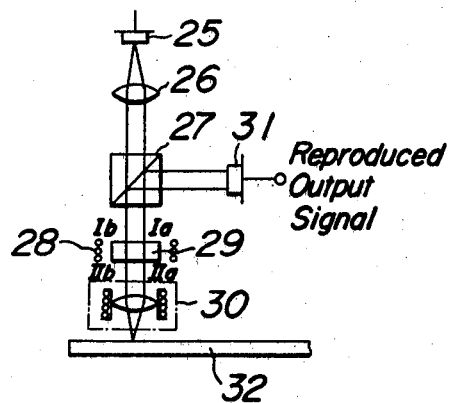
FIG. 2 is a diagrammatic view illustrating a construction of another embodiment of conventional information reproducing apparatus based on an opto-magnetic system.
Figure 3:
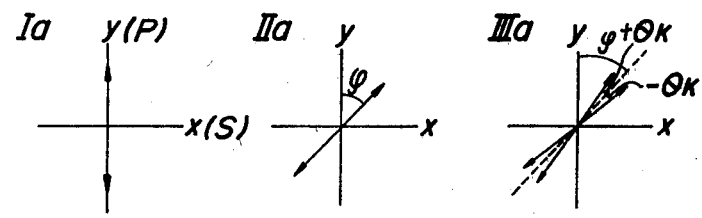
FIGS. 3 and 4 are schematic views explaining the operation of the known apparatus.
Figure 3:
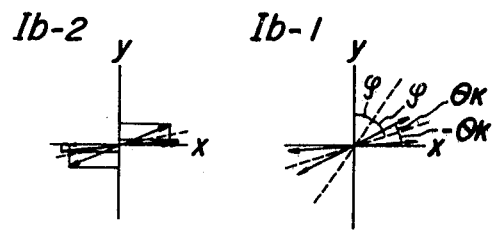
Figure 4:
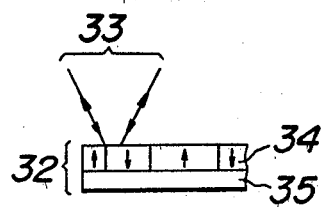
Figure 6:
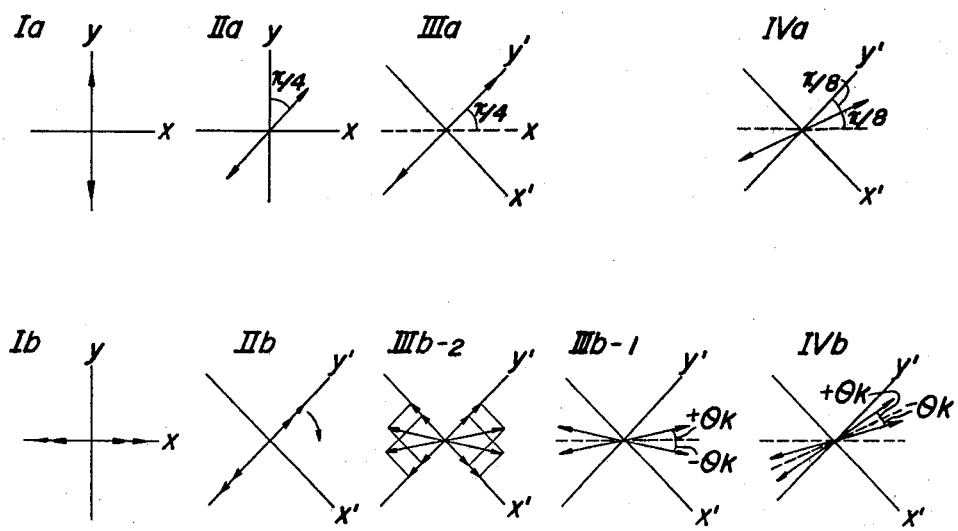
FIG. 6 is a schematic view explaining the operation of the apparatus shown in FIG. 5.

The light beam radiated from the laser diode 36 is collimated by the collimator lens 37 and projected onto the beam splitter 38. The light beam emanated from the laser diode 36 is held under pretty well polarized condition so that if as shown in FIG. 6-I$a$ the polarizing direction of light beam from the laser diode 36 is made coincident with the polarizing axis (y-axis in FIG. 6) of the first beam splitter 38, the utility factor of laser light becomes very high. The linearly polarized light beam converted by the beam splitter 38 has its polarizing direction rotated by an angle $\pi/4$ by means of the first Faraday element 40 as shown in FIG. 6-II$a$ and projected onto the second polarizing light beam splitter 41 having polarizing axis slanted by an angle $\pi/4$ with respect to that of the beam splitter 38. As shown in FIG. 6-III$a$, the polarizing direction of linearly polarized light transmitted through the Faraday element 40 is made coincident with the polarizing axis of the second beam splitter 41 so that this linearly polarized light is transmitted through the second beam splitter 41 as it is and projected onto the second Faraday element 43. The linearly polarized light beam has its polarizing direction rotated by an angle $\pi/8$ via the second Faraday element 43 as shown in FIG. 6-IV$a$ and focused and projected onto the record medium 47 by the lens provided in the pick-up device 44. The information signal shown in FIG. 4 is recorded on the record medium 47 so that as shown in FIG. 6-IV$b$ the focused light beam is subjected to Kerr rotation $+\theta_k$ or $-\theta_k$ corresponding to the direction of magnetization in the record medium. The reflected light beam from the record medium 47 has its polarizing direction further rotated by an angle $\pi/8$ by the second Faraday element 43 as shown in FIG. 6-III$_{b-1}$ and projected on the second beam splitter 41. As shown in FIG. 6-III$_{b-2}$ the light beam component (x'-axis component) perpendicular to the polarizing axis (y'-axis) of the incident light beam is reflected by the beam splitter 41, and projected onto the first photodetector 45. While the light beam component (y'-axis component) having the polarizing direction coincident with the polarizing axis of the incident light beam as shown in FIG. 6-II$b$ is transmitted through the second beam splitter 41, and has its polarizing direction further rotated by the angle $\pi/4$ by the first Faraday element 39, and then projected onto the first beam splitter 38. As shown in FIG. 6-I$b$ the polarizing direction of the transmitted light beam component is perpendicular to the polarizing axis of the first beam splitter 38 so that this light beam component is fully reflected by the beam splitter 38 and projected onto the second photodetector 46. As is seen from FIG. 6-III$_{b-2}$ the information signal recorded on the record medium 47 can be obtained as the difference of output signals coming from the first and second photodetectors 45 and 46. According to the present invention the reflected light beam from the record medium is fully reflected by the first and second polarizing light beam splitters 38 and 41 and cannot be returned to the laser diode 36 so that the above described back-talk does not occur at all.

Moreover, there has been proposed by the present applicant an information reproducing method in which one or both of light beams passed through a point symmetrical with respect to an optical axis of light beam incident on the surface of a record medium is or are transmitted through respective rotatory polarizers or phase shifters, the light beam reflected by the record medium is again transmitted through the rotatory polarizers or phase shifters, thereby to make the direction of Kerr rotation, to which the light beam at each symmetrical position is subjected, reverse with respect to the rotation of polarization plane of the light beam performed by the rotatory polarizer or phase shifter, and the reversely rotated light beam is projected onto respective photodetectors after passed through the polarizing light beam splitter thereby obtaining reproduced signal. In this method the detected signal becomes maximum when the rotation of polarization plane in the rotatory polarizer or phase shifter is $\pi/4$ per a reciprocating operation so that the half of light beam is returned to the laser diode side resulting in an occurrence of back-talk.

It is possible to apply the present invention to such a detecting method thereby constructing an advantageous optical system by combining the polarizing light beam splitter and the Faraday element.

Figure 7:
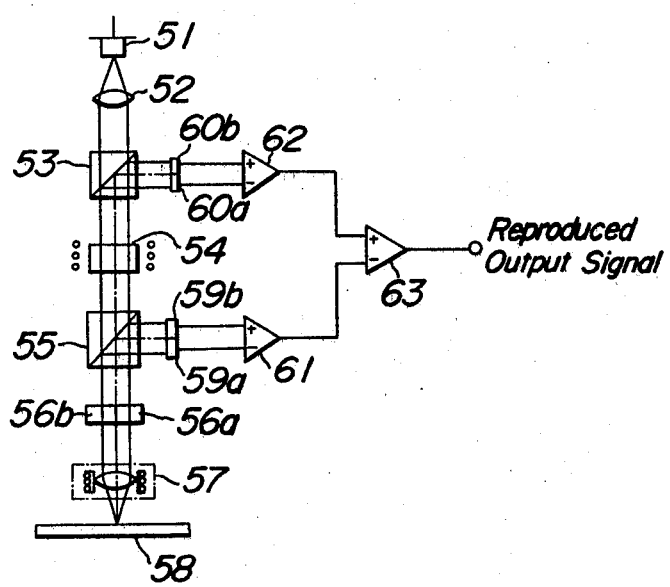
FIG. 7 is a diagrammatic view illustrating a construction of another embodiment of the information reproducing apparatus based on an opto-magnetic system according to the present invention.
Figure 8:
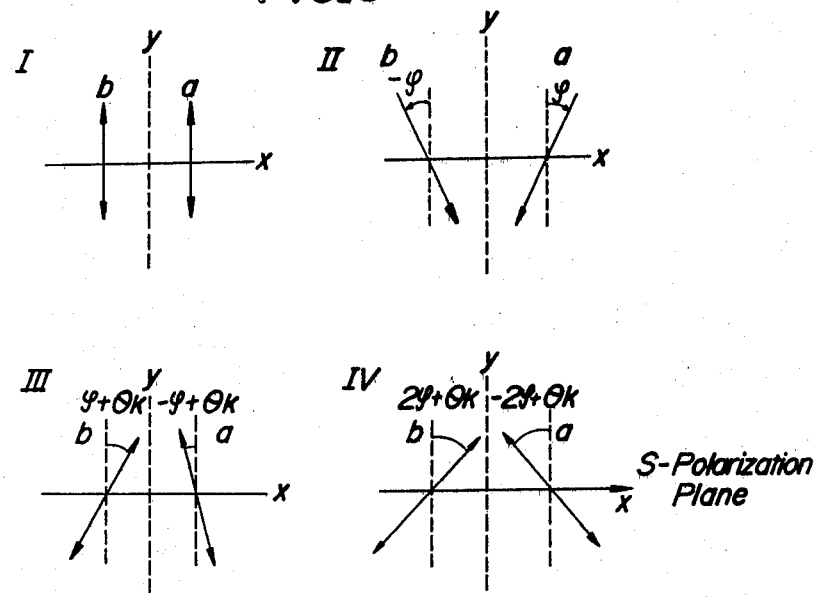
FIG. 8 is a schematic view explaining the operation of the apparatus shown in FIG. 7.

FIG. 7 shows such a construction. The light beam radiated from a laser diode 51 is collimated by a collimator lens 52 and passed through a first polarizing light beam splitter 53. In case of making the polarization plane of the laser beam coincident with P-polarization plane of the first beam splitter 53, the loss of light quantity can be made small. The light beam emanated from the first beam splitter 53 has its polarization plane rotated by an angle $\pi/4$ by a first Faraday element 54 and passed through a second polarizing light beam splitter 55. P-polarization plane of the second beam splitter 55 is slanted by an angle $\pi/4$ with respect to that of the first beam splitter 53. The light beam emanated from the second beam splitter 55 is passed through an optical member consisting of a right-handed quartz 56a and a left-handed quartz 56b and projected onto a record medium 58 through a pick-up device 57. FIG. 8 shows a rotation of the polarization plane of light beam viewed in the coordinates of an optical system. The polarization plane of light beam passed through the first and second beam splitters 53 and 55 is in y-axis direction as shown in the portions a and b of FIG. 8-I and passed through the right-handed rotatory polarizer 56a and the left-handed rotatory polarizer 56b which are located symmetrically with respect to a line passing through the optical axis. In this embodiment as shown in FIG. 8-II one half of light beam rotates by an angle $\phi$ in the forward (positive) direction and another half of light beam rotates by an angle $-\phi$ in the reverse (negative) direction. Two halves of reflected light beam from the surface of the record medium 58 are exchanged in its position with each other so that as shown in FIG. 8-III the light beam at the portion a is pointed in the direction of angle $-\phi+\theta_k$ and the light beam at the portion b points in the direction of angle $\phi+\theta_k$, where $\theta_k$ is Kerr rotation angle on the record medium and changes its sign depending on the direction of magnetization in the record medium. The light beam reflected from the record medium is again passed through the right-hand rotatory polarizer 56a and the left-handed rotatory polarizer 56b so that as shown in FIG. 8-IV the rotatory polarizing direction of the light beam takes angles $-2\phi+\theta_k$ and $2\phi+\theta_k$, respectively. This light beam is reflected by the second plarizing light beam splitter 55 and projected onto photodetectors 59a and 59b. The polarization plane of the beam splitter 55 is made coincident with x-axis so that quantity of light beam incident on the photodetectors 59a and 59b which are placed to receive light beam in each portion a and b, becomes $$\frac{I}{2} \sin^2(-2\phi + \theta_k) \text{ and } \frac{I}{2} \sin^2(2\phi + \theta_k).$$

If a coefficient of photoelectric conversion is taken as S the output of a first differential amplifier 61 which is connected to the photodetectors 59a and 59b is shown as follows.

When Kerr rotation is $\theta_k$ $$E_+ = \frac{SI}{2} \{\sin^2(2\phi + \theta_k) - \sin^2(-2\phi + \theta_k)\}$$

$$= \frac{SI}{2} \sin 4\phi \sin 2\theta_k$$

And when Kerr rotation is $-\theta_k$ $$E_- = -\frac{SI}{2} \sin 4\phi \sin 2\theta_k$$

Light beam passed through the second polarizing light beam splitter 55 is polarized in y-axis direction and its quantity is $$\frac{I}{2} \cos^2(-2\phi + \theta_k) \text{ or } \frac{I}{2} \cos^2(2\phi + \theta_k),$$

respectively. The light beam passed through the beam splitter 55 is again rotated by an angle $\pi/4$ by the Faraday element 54 and projected onto the first polarizing light beam splitter 53. The polarization plane of the rotated light beam is made coincident with S-polarization plane of the first polarizing light beam splitter 53, so that this light beam is fully reflected by the beam splitter 53 and projected onto photodetectors 60a and 60b. Outputs of the photodetectors 60a and 60b are supplied to a second differential amplifier 62 so that the outputs of the differential amplifier 62 are shown as follows.

When Kerr rotations are $\pm\theta_k$ $$E'_\pm = \pm\frac{SI}{2} \{\cos^2(2\phi + \theta_k) - \cos^2(-2\phi + \theta_k)\}$$

$$= \mp\frac{SI}{2} \sin 4\phi \sin 2\theta_k$$

As is seen from the above equation, these outputs of the second differential amplifier 62 and the first differential amplifier 61 are reverse in its sign with each other. These outputs of the first and second differential amplifiers 61 and 62 are supplied to a third differential amplifier 63. Output of the third differential amplifier 63 is shown as follows.

$$E''_+ = E'_+ - E_+ = SI\sin 4\phi \sin 2\theta_k \text{ (Kerr rotation is } \theta_k)$$

and $$E''_- = E'_- - E_- = -SI\sin 4\phi \sin 2\theta_k \text{ (Kerr rotation is } -\theta_k)$$

As is seen from the above equations the output of the differential amplifier 63 (beam splitters 55 and 53) is two times that of the differential amplifier 61 (beam splitter 55 only). According to such construction the light beam reflected from the record medium 58 is fully reflected in quantity by first and second beam splitters 53 and 55 so that the back-talk to the laser diode 51 can be removed completely. In order to obtain excellent signal it is necessary for the second beam splitter 55 to use a polarizing light beam splitter having large extraction ratio, such as Nicol's prism. Escaped Glan-Thompson prism or the like. However, it is possible for the first beam splitter 53 to use a common polarization prism having a conventional polarizing film formed therein.

According to the present invention the signal detection can be performed with high S/N and reliable focusing servo and tracking servo can be effected with high stability, because the reflected light beam from the record medium does not return to the laser diode side and thus the back-talk does not occur. An angle between the analyzing axis of the analyzer and the polarizing direction of light beam subjected to Kerr rotation is made $\pi/4$ so that as shown in equations (1) and (2) signal detection can be performed with highest efficiency. Moreover S/N of the reproduced signal can be improved because of possibility of differential detection. High utility factor can also be obtained since half-mirror is not used.

What is claimed is:

1. An information reproducing apparatus for reading out information recorded on a reflective record medium based on an opto-magnetic effect, the apparatus comprising
   a light source for generating a collimated light beam;
   a first polarizing beam splitter arranged to receive the collimated light beam and having a polarizing axis extending in a given direction for converting the collimated light beam therethrough into a linearly polarized light beam;
   a first Faraday element arranged to receive the light beam transmitted through the first beam splitter for rotating the polarizing direction of the linearly polarized light beam by an angle $\pi/4$;
   a second polarizing beam splitter arranged to receive the light beam transmitted through the first Faraday element and having a polarizing axis slanted by an angle $\pi/4$ with respect to the polarizing axis of the first beam splitter;
   a pick-up device arranged to receive the light beam transmitted through the second beam splitter for projecting and converging the light beam onto the reflective record medium and for picking up the reflected beam and passing it back to the first and second beam splitters;
   a first photodetector arranged to receive the light beam reflected by the record medium and the second beam splitter; and
   a second photodetector arranged to receive the light beam reflected by the record medium, transmitted through the second beam splitter and reflected by the first beam splitter.

2. An information reproducing apparatus as claimed in claim 1, wherein an optical member for rotating the polarizing direction of the light beam transmitted therethrough is provided between the second beam splitter and the pick-up device.

3. An information reproducing apparatus as claimed in claim 2, wherein the optical member is a second Faraday element.

4. An information reproducing apparatus as claimed in claim 3, wherein the second Faraday element rotates the polarizing direction of the light beam transmitted therethrough by an angle $\pi/8$.

5. An information reproducing apparatus as claimed in claim 2, wherein the optical member comprises two halves of a rotatory polarizer having clockwise and anticlockwise rotatory polarizing direction, respectively, thereby rotating the polarizing direction of the light beam reflected by the record medium and transmitted through the optical member with respect to the polarizing direction of the linearly polarized light beam incident upon the optical member.

6. An information reproducing apparatus as claimed in claim 5, wherein the first photodetector comprises first and second photodetector units and a first differential amplifier connected to the first and second photodetector units, and the second photodetector comprises third and fourth photodetector units and a second differential amplifier connected to the third and fourth photodetector units.

7. An information reproducing apparatus as claimed in claim 1, wherein the light source is a semiconductor laser diode for generating the collimated light beam having a polarizing direction parallel with the polarizing axis of the first beam splitter.

8. An information reproducing apparatus as claimed in claim 1, wherein the second beam splitter is a Nicol's prism.

9. An information reproducing apparatus as claimed in claim 1, wherein the second beam splitter is an Escaped Glan-Thompson prism.

10. An information reproducing apparatus as claimed in claim 1, wherein the first beam splitter is a polarizing prism having a polarizing film provided therein.

11. An information reproducing apparatus as claimed in claim 1, wherein the first and second photodetectors are connected to a differential amplifier means for generating the information as a reproduced output signal.

* * * * *